United States Patent [19]
Powell

[11] Patent Number: 6,002,483
[45] Date of Patent: Dec. 14, 1999

[54] NON-CONTACT INTERFERENCE OPTICAL SYSTEM FOR MEASURING THE LENGTH OF A MOVING SURFACE WITH A LARGE N.A. COLLECTOR OPTICAL SYSTEM

[75] Inventor: Ian Powell, Gloucester, Canada

[73] Assignee: National Research Council of Canada, Ottawa, Canada

[21] Appl. No.: 09/039,473

[22] Filed: Mar. 16, 1998

[51] Int. Cl.⁶ .................................................. G01B 9/02
[52] U.S. Cl. .......................... 356/354; 356/356; 356/28.5
[58] Field of Search ..................................... 356/345, 353, 356/354, 356, 358, 28.5

[56] References Cited

U.S. PATENT DOCUMENTS

| | | | |
|---|---|---|---|
| 4,696,568 | 9/1987 | Weistra | 356/28.5 |
| 4,948,257 | 8/1990 | Kaufman et al. | 356/354 |
| 5,608,522 | 3/1997 | Breda | 356/345 |

*Primary Examiner*—Samuel A. Turner

[57] ABSTRACT

An optical device for measuring the length of a surface that has an undulating specular appearance. The device includes a beam delivery unit that superimposes a pair of laser beams onto a moving surface for producing an interference pattern having straight-line fringes on it and a light collector assembly that captures radiation reflected from different parts along the surface and directs the radiation to a detector. One particular beam delivery unit creates two interfering beams by using refracting prisms to intercept and redirect half of an elliptically shaped laser beam leaving the other half as the second beam. The collector assembly can have a variety of configurations and acts like a bucket collecting as much of the reflected radiation as possible. In order to accomplish this, the numerical aperture in the object space of the collector assembly is made greater than 0.5. In one embodiment, the collector assembly includes a plano-convex lens to collect narrow to moderate angle radiation, and the combination of a concave annular reflector and a partially reflective convex surface of the plano-convex lens to collect the moderate to wide angle radiation reflected from the moving surface to be measured. In other embodiments, Fresnel, aspheric or high refractive index lenses are used to collect the radiation reflected from the surface.

19 Claims, 5 Drawing Sheets

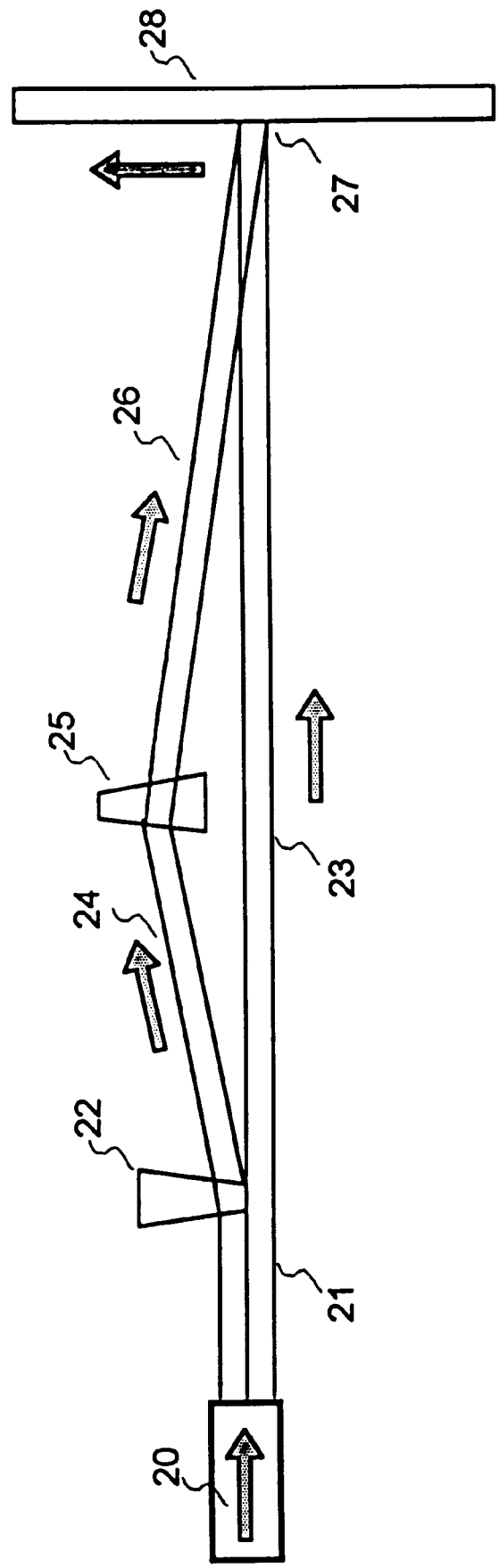

NON-CONTACT INTERFERENCE OPTICAL SYSTEM FOR MEASURING THE LENGTH OF A MOVING SURFACE WITH A LARGE N.A. COLLECTOR OPTICAL SYSTEM

FIELD OF THE INVENTION

The invention is directed to an optical device for measuring the length of a surface such as a cable as it passes from one location to another usually with the aid of some form of reels. More particularly it is directed to a versatile device capable of performing length measurements on a wide variety of surface types, such as undulating specular surfaces, including corrugated type structures.

BACKGROUND OF THE INVENTION

There are numerous examples of diffraction-based laser Doppler velocimeters that are used to measure the length of a moving surface. Some of these devices use diffraction gratings to split a laser beam into two beams and then recombine them to establish an interference pattern in the vicinity of the moving surface to be measured. Some examples are described in publication by J. Schmidt et al, Diffractive Beam Splitter for Laser Doppler Velocimetry Optics Letters/Vol 17, No 17/Sep. 1, 1992; U.S. Pat. No. 5,216,478 which issued on Jun. 1, 1993 to Kadowaki et al, and Canadian Patent Application 2,165,136 by Pawluczyk et al which was opened to public inspection on Jun. 14, 1997. Each of the above approaches makes use of two diffractive optical components, the first acts as a beam-splitter dividing the incident laser beam into two and the second brings them back together at some convenient point down-stream. Appropriate use of diffractive orders makes this possible with the separation of the fringes remaining constant even for a shift of wavelength. This property has proved extremely useful in the past when using light sources whose wavelengths tended to drift from their nominal settings.

In other systems, such as the one described in U.S. Pat. No. 4,334,779 which issued on Jun. 15, 1982 to Jacques Domey et al, as well as U.S. Pat. 4,948,257 which issued on Aug. 14, 1990 to Kaufmann et al, the initial beam is split using a beam-splitter cube. This, at least partially refractive approach is generally more efficient than the diffractive approach above and assures that there are no extra beams generated which could possibly interfere and upset the integrity of the fringe pattern. The fact that the actual fringe spacing is dependent on wavelength and varies linearly with it, is no longer an insurmountable problem. This is because laser diode sources, stabilized at a given wavelength, can now be obtained for a relatively small penalty in cost. However, the use of beam-splitter cubes or plates, for example those which employ a beam-splitter interface which reflects half the light incident on it, can create stability problems. If the beam incident on the beam-splitter experiences a change in direction by reason of some instability upstream in the system or the beam-splitter itself being subjected to an angular displacement, then this would result in a serious degradation in the accuracy of the instrument. For example, if there is a 4 degree convergence of the two interfering beams and a change in direction of the incident beam on the reflective beam-splitter surface in glass of just 5 access, this would translate to an error of around 0.1% in length measurements.

The prior art length measuring devices are directed to the measurement of surfaces that are without structure and/or are diffuse. They are not capable of measuring surfaces that are structured and at the same time specular. Specular surfaces that are undulating, such as corrugated, wavy or prismatic surfaces, tend to have substantial slope variations over their surface, which result in radiation being deflected from the surface at angles greater than ±30°. The prior art devices are unable to collect and detect radiation from such a broad cone and therefore would produce inaccurate measurements.

SUMMARY OF THE INVENTION

It is therefore an object of the present invention to provide an optical device for measuring moving surfaces that are at the same time undulating and specular.

These and other objects are achieved in a non-contact optical measurement device for measuring the length or speed of a surface in relative motion with the device which includes an optical source for producing an optical interference pattern on the surface and optics for receiving modulated radiation reflected from the surface. The receiving optics includes a detector for measuring the received reflected radiation and a radiation collector that has a numerical aperture in object space >0.5 for collecting reflected radiation from the surface and focusing the radiation onto the detector.

In accordance with another aspect of the invention, the radiation collector for the optical measurement device may include a refracting optical group and a reflecting and refracting optical group. The refracting group consists of a piano-convex lens for collecting narrow to moderate angle radiation reflected from the surface and an optical arrangement for receiving and focusing the collected radiation onto the detector. The reflecting and refracting optical group consists of a concave annular reflector for collecting moderate to wide angle radiation reflected from the surface and for directing the radiation onto the convex surface of the plano-convex lens which has a partially reflective coating on it to collimate the radiation. The radiation thus collected is also directed through the focusing optical arrangement to be focused onto the detector. Alternately, the radiation collector may include a Fresnel lens, an aspheric lens or a high refractive index lens to collect the radiation reflected from the surface and an optical arrangement to receive and focus the collected radiation onto the detector. A Fresnel, an aspheric, or a high refractive index lens may also be used as the focusing optical arrangement.

In accordance with a further aspect of this invention, the beam delivery unit for producing an optical interference pattern on the surface to be measured may consist of a laser for producing a light beam, a first prism for deflecting a first portion in cross-section of the light beam, a second prism for deflecting the first deflected portion of the light beam in a direction to converge with the non-deflected portion of the light beam and a reflector group for directing the converging deflected and non-deflected portions of the light beam to form the interference pattern on the solid surface. The laser beam cross-section is preferably elliptical in cross-section.

In accordance with another aspect of the invention, a diffuser and a cone may be placed immediately in front of the measuring device detector in order to produce more uniform light on the detector.

Many other objects and aspects of the invention will be clear from the detailed description of the drawings.

BRIEF DESCRIPTION OF THE DRAWINGS

Embodiments of the invention are described in the drawings, in which:

FIG. 2 illustrates a beam delivery unit in accordance with the present invention;

DETAILED DESCRIPTION

Although the electronic processing of the detected signals in an optical length measuring device for moving surfaces is an integral part of the instrument, the present invention is directed to the optical portion of the device and may use any standard state of the art processing method.

Figure 1:
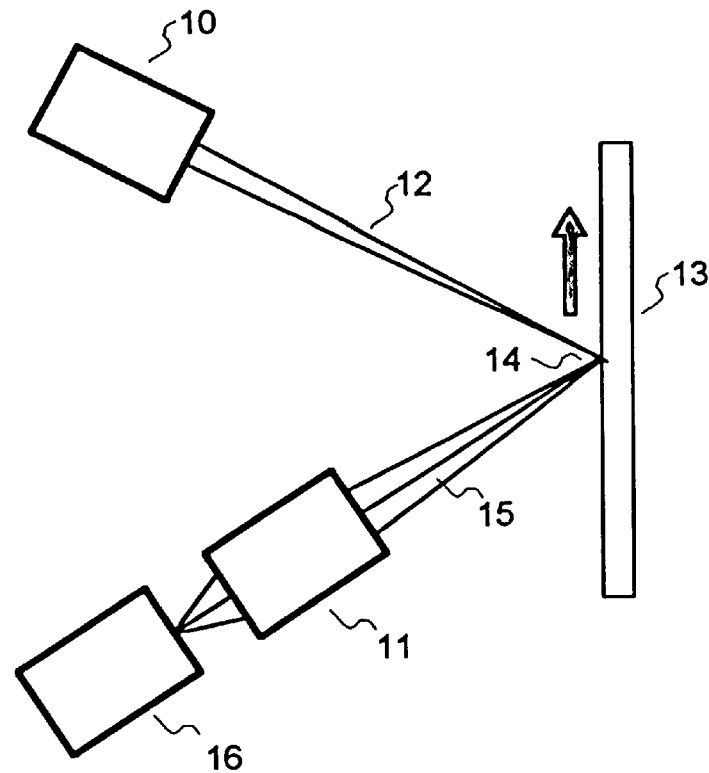
FIG. 1 is a schematic of the basic optical system for a cable length measuring device.

The optical system shown in FIG. 1 includes two distinct components, a beam delivery unit 10 and a light collector assembly 11 each having well-defined functions. The function of the beam delivery unit 10 is to superimpose a pair of laser beams 12 onto a surface 13 such as that of a cable. This produces an interference pattern having straight-line fringes similar to a one-dimensional grid in close proximity 14 to the surface 13. Depending on the surface's 13 structure and reflectance, some of the incident radiation is reflected back 15. A certain amount of the reflected radiation is then captured by the collector assembly 11 and fed to a detector 16 producing a signal that remains substantially constant if no changes to the configuration occur. If, however, one considers some structure on the surface 13 running past this grid, a fluctuation is introduced to the detector s signal due to the change in the amount of radiation being reflected from different parts of the surface 13. Knowledge of the fringe spacing and the temporal frequency of the signal s modulation allows the length of surface 13 passing by to be computed. The collector assembly 11 that can have a variety of configurations acts like a bucket collecting as much of the reflected radiation as possible. The present invention is particularly suited to measure specular surfaces that are undulating, such as corrugated, wavy or prismatic surfaces, that is to say, surfaces that have substantial slope variations over their surface. Furthermore, the invention is equally applicable for the measurement of surfaces on which the undulations are non-periodic as well as those that are periodic. Though the present invention is particularly advantageous in its ability to measure the length of undulating specular surfaces, it will also accurately measure the lengths of non-structured or diffuse surfaces. The embodiments of the present invention will be described with regard to cable, but it is understood that the device is capable of measuring the lengths of all types of moving surfaces.

FIG. 2 illustrates a beam delivery unit in accordance with the present invention. It is an optical arrangement that creates two interfering beams using refraction rather than diffraction as described in the prior art.

A laser 20, preferably one that is frequency stable, generates a laser beam 21. A first prism 22 is positioned partially into the laser beam 21 resulting in one half 23 of the beam 21 continuing unimpeded and totally unaffected by the presence of the prism while the other half 24 is deflected in the direction of the wedge angle of the prism 22. A second prism 25, positioned at an appropriate distance downstream in the path of beam 24, re-directs beam 24 as beam 26 back to converge with beam 23 to form an interference pattern at the surface 27 of a moving cable 28. The amounts of deviation experienced by the beam 21 at prism 22 is different from that of beam 24 at prism 25, the deviation at prism 25 being more than the deviation at prism 22. For practical reasons, the two beams are projected close to normal incidence onto the surface. For fringe spacing around 10 m, a convergence of approximately 4 degrees is required for the two interfering beams having a wavelength of 680 nm. Typical wedge angles for the prisms can be in the order of 15 and 22 degrees respectively if the prism material used were SK2 optical glass. If uncorrected, the dispersion i.e. the change of refractive index with wavelength, associated with the glass of the prisms would introduce a certain amount of chromatic aberration. While this can be easily corrected by achromatizing the prism pair arrangement—employing glasses having different dispersions—correction is generally not required. This prism configuration for the beam delivery unit in FIG. 2 represents a major improvement in stability over other refractive based systems, for example those which employ a beam-splitter interface which reflects half the light incident on it. The present device basically uses refraction to produce the two interference beams 26 and 23 with both prisms 22 and 25 set for minimum deviation. Any angular change in prism orientation will have negligible affect on the beam s direction, hence no variation in the angle of convergence of the two beams and no loss in accuracy. The laser beam 21 can have any of a variety of cross-sections, however an elliptical beam with the long axis in the direction of the deflection is particularly appropriate. Such an elliptical beam will result in a more optimum shape in the interference pattern of the two interfering beams and is more forgiving to their alignment.

Non-structured surfaces or surfaces that are highly diffuse tend to be forgiving as to the type of collector assembly 11 required in a moving surface measuring system. Generally optics that has a numerical aperture in the order of 0.1, is adequate for collecting the reflected radiation from those cable types.

Figure 3:
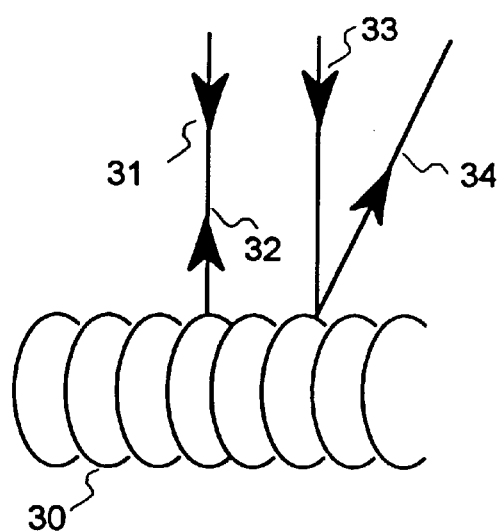
FIG. 3 illustrates radiation reflections from a corrugated specular cable.

FIG. 3 illustrates the necessity of an extremely large numerical aperture for the collector assembly 11 optics. A corrugated cable 30 that has an undulating surface is shown with various incident beams projected onto it. In one situation, the reflected beam 32 returns virtually along the incident beam 31 perpendicular to the cable 30. In another situation, the reflected beam 34 forms a substantial angle with the incident beam 33. The reflection angle of the radiation from such surfaces has been found to be in a range extending up to at least ±60°.

As determined in FIG. 3, the collector optics 11 must have an extremely large numerical aperture in order to handle a variety of surfaces 13 such as the corrugated type. For example, radiation with a reflection angle of 60° would require the collector optics to have a numerical aperture in the order of 0.87. The collector optics 11 in accordance with the present invention is not only capable of collecting the reflected radiation having a small reflecting angle, but also collects a good fraction of the radiation that has a reflective angle greater than ±30°. The large acceptance angle associated with the collector assembly 11 results in continuous collection of the radiation reflected off of the moving surface 13 so that the signal reaching a detector 16 is effectively uninterrupted, thereby providing maximum accuracy for the instrument.

It has also been determined that the collector assembly 11 must include an arrangement for which the aberration correction has been addressed for an extremely large numerical aperture, equivalent to 0.5 or greater. While the image quality does not have to be similar or even close to that found with camera lenses or the like, it is imperative that ray bundles passing through the system actually arrive at more-or-less their appropriate destination. The collector assembly 11 will include a combination of optics consisting of collecting and focusing optical arrangements, each arrangement having one or more optical elements. For practical reasons, such as the design and the cost of the optics, when imaging the radiation onto a detector, it is more convenient for the cone angle of the radiation in image space at the detector to be smaller than the radiation cone angle in the object space at the measured surface; however this is not necessary for proper operation. The numerical aperture in the object space must be very large, 0.5 or greater, while the image space may have a numerical aperture of 0.5 or less, such as for instance 0.2; thus the collecting optical arrangement is working harder than the focusing optical arrangement.

Figure 4:
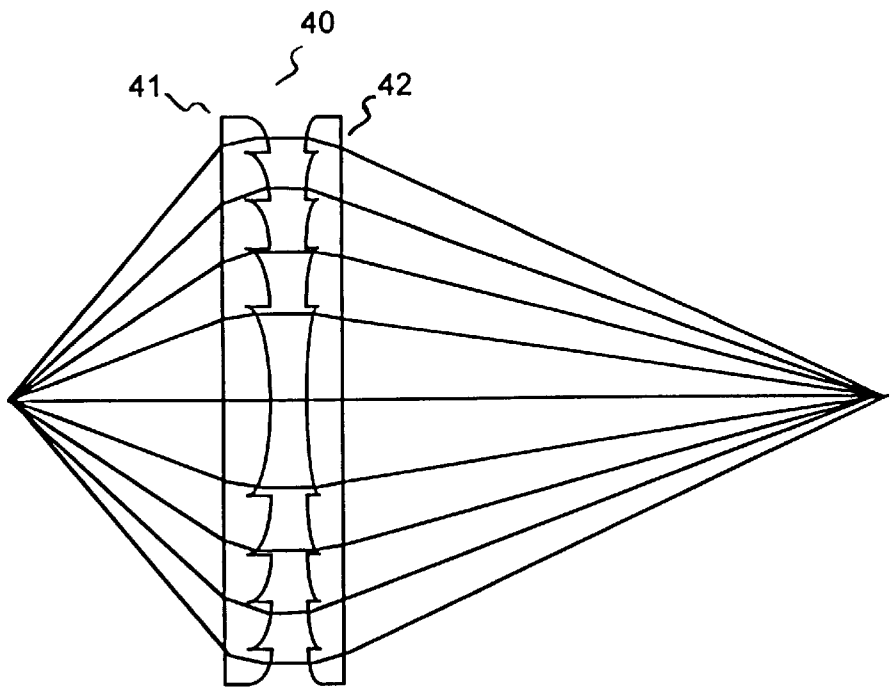
FIGS. 4, 5 and 6 illustrate 3 different collector assemblies in accordance with the present invention.
Figure 5:
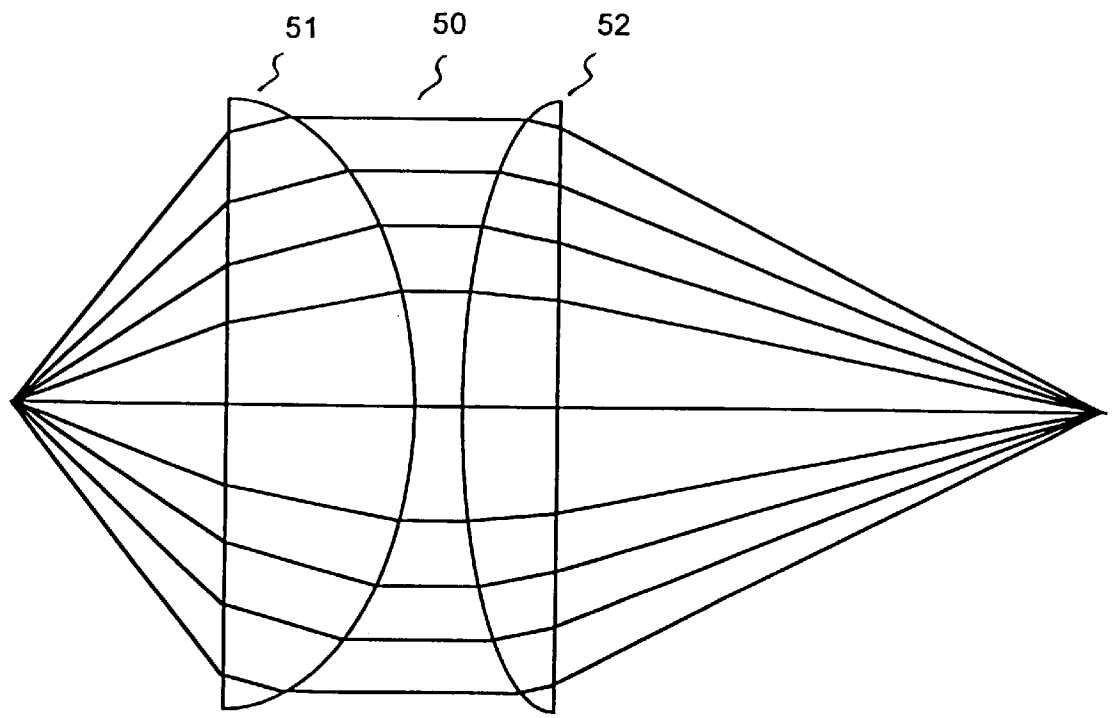
Figure 6:
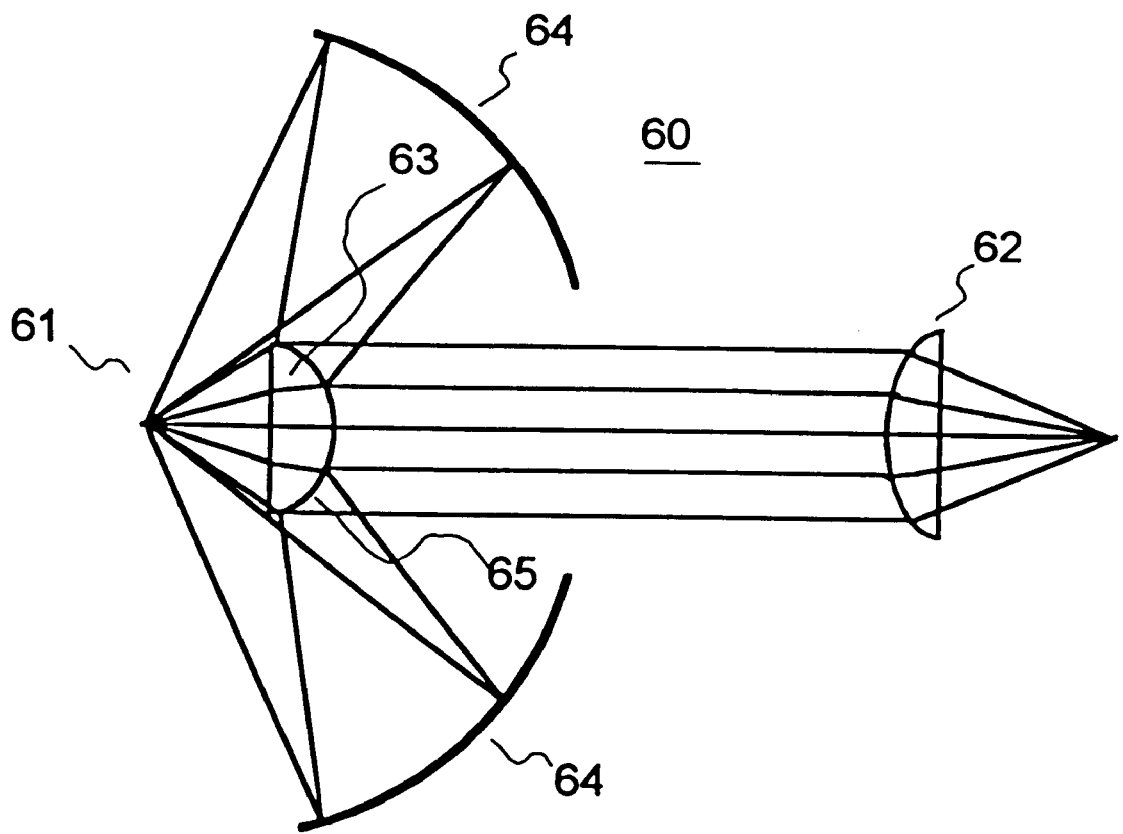

FIGS. 4, 5 and 6 illustrate different collector assemblies in accordance with the present invention.

The collector assembly 40 shown in FIG. 4 includes two Fresnel lenses 41 and 42. In this particular embodiment, their focal lengths are 75 and 150 mm respectively, each have a diameter of 150 mm. The Fresnel lens 41 has a numerical aperture greater than 0.5, for example the numerical aperture of 0.87 in the present embodiment. However lens 42 does not need to be a Fresnel lens; lens 42 may be a single positive lens such as a plano-convex lens with a numerical aperture of less than 0.5, or other type of optical arrangement such as a series of lenses.

The collector assembly 50 shown in FIG. 5 includes aspheric lenses 51 and 52. In this particular embodiment, their focal lengths are 75 and 150 mm respectively, each having a diameter of 150 mm. The aspheric lens 51 has a numerical aperture greater than 0.5, for example the numerical aperture of 0.87 in the present embodiment. However, once again, lens 52 does not need to be an aspheric lens; lens 52 may be a single positive lens such as a piano-convex lens with a numerical aperture of less than 0.5, or other type of optical arrangement such as a series of lenses.

The two embodiments described above can readily be implemented such that the collector assembly will collect radiation with a reflection angle in the order of 60°. However, in certain circumstances depending on the structure of the moving surface being measured, it may only be necessary to collect radiation having a somewhat smaller reflection angle. In these situations, the aspheric lens 51 in FIG. 5 may be replaced by a positive single lens, such as a plano-convex lens, having a high refractive index. For example a lens formed from SF6 glass which has a refractive index of 1.8 will provide a collector assembly that will accept reflected radiation up to an angle of ±35°. On the other hand, a lens made from ZnS which has a refractive index of 2.4 will provide a collector assembly that will accept reflected radiation up to an angle of ±45° without substantial breakdown. For a simple plano-convex lens to collect radiation reflected at an angle of 30° or more without breakdown, the refractive index of the lens material would have to be greater than 1.6. In a collector assembly of this type, aspheric lens 52 may be replaced by a variety of focusing optical arrangements such as a high refractive index lens, a positive single lens or a series of lenses. Also in the case where the lenses are made from ZnS, the reflected radiation collecting lens 51 may for example have a focal length of 105 mm with a diameter of 150 mm and the focusing lens 52 may have a focal length and diameter of 150 mm.

The collector assembly 60 in FIG. 6 includes a collecting section 61 and a focusing optical arrangement consisting of a lens 62. The collecting section 61 includes a positive single lens such as a plano-convex lens 63 and a concave annular reflector 64. The lens 63 collects narrow to moderate angle radiation and directs it to focussing lens 62, moderate angle radiation being in the order of 20°. In addition, the rear surface 65 of the lens 63 is partially reflective to direct moderate to wide angle radiation reflected from the surface of concave reflector 64 to lens 62. The combination of the lens 63 and the mirror 64 result in a collector assembly 60 with a large numerical aperture capable of collecting radiation over a wide angle. Since the rear surface 65 of lens 63 acts as a secondary mirror of the reflector 64, a constraint is imposed on the design that allows radiation to be directed to lens 62 through the lens 63 by refraction and from the back surface 65 of the lens 63 by reflection. This, in fact, can be accommodated by a refracting lens 63 that is solely a simple plano-convex lens made from BK7 optical glass, however, the plano surface of lens 63 may also be curved. The reflector system including the mirror 64 and the reflective surface 65 of lens 63 is basically a Schwarzschild-like objective, being corrected for primary spherical and coma together with chromatic aberrations. The focusing lens 62 can be, but is not limited to a simple plano-convex lens. Likewise the Schwartzchild-like objective is not limited to surfaces which are spherical in shape. Allowing them to be aspherical provides the designer extra degrees of freedom, if for example the size of the secondary mirror 65 is to be reduced. For the system described here, the focal length of the reflector arrangement is around 30 mm while those of the two plano-convex lenses are around 60 mm.

Figure 7:
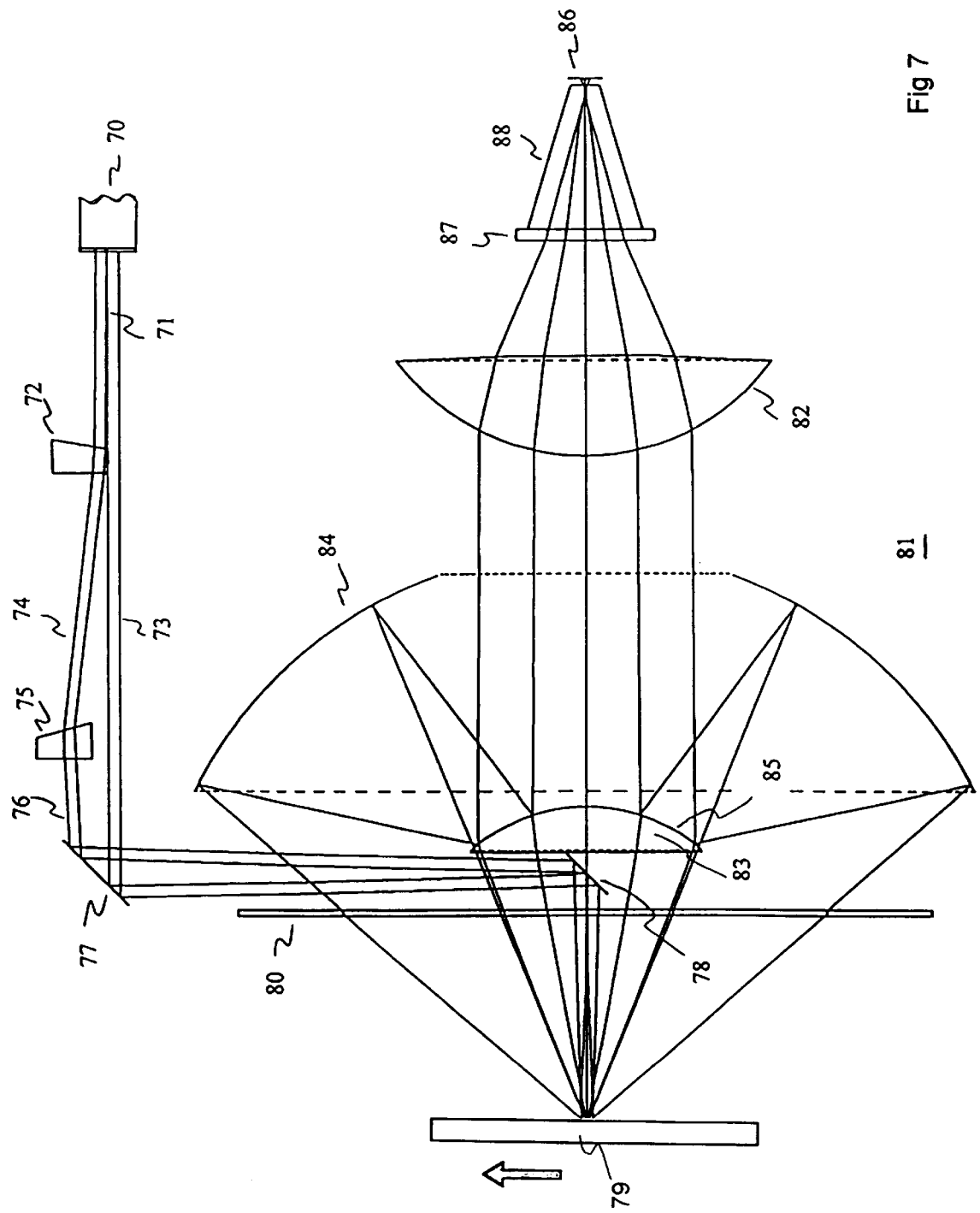
FIG. 7 illustrates an embodiment of the optics assembly in a cable length measuring system in accordance with the present invention.

FIG. 7 illustrates an embodiment of the optics assembly in a cable length measuring system in accordance with the present invention. It combines the beam delivery unit described with respect to FIG. 2 with the collector assembly described with respect to FIG. 6. It is appreciated, however, that any of the collector assemblies described with respect to FIGS. 4, 5 and 6 could be used in the system.

The beam delivery unit includes a laser 70 that generates a beam 71 that is directed towards a prism 72. A first half of the beam 73 continues unimpeded towards a plane mirror 77. The second half of the beam 74 is refracted by prism 72 towards a second prism 75 forming a refracted beam 76 which is also directed to mirror 77 such that the two beams 73 and 76 are converging towards a second plane mirror 78. Mirror 78 directs the beams towards the surface of a moving cable 79 where an interference pattern is formed. A window 80 is schematically shown between the entire optical assembly and the work piece to show that the length measuring system can be hermetically sealed to protect it from dust and other contaminants. As can be seen, a working distance to accommodate the delivery optics in close proximity to the work piece has also been provided.

Radiation is reflected from the moving cable over a wide angle. The collector assembly in FIG. 7 includes a collecting section 81 and a focusing lens 82. The collecting section 81 includes a single plano-convex lens 83 and an annular concave reflector 84. The lens 83 collects radiation and directs it to the focussing lens 82. However, in addition, the rear surface convex portion 85 of the lens 83 has a beam-splitter coating to direct the radiation reflected from the surface of reflector 84 to the focussing lens 82. For the system described here, the focal lengths for the reflector arrangement and the two plano-convex lenses are around 30, 60 and 60 mm respectively. The collected radiation refracted through the lens 83 and reflected from the lens surface 85 is received by lens 82 which focuses it onto a detector 86.

When the cable 79 is wound from one reel to the next, it experiences a certain amount of sideways and up and down motion. Displacement of the surface from its nominal position, either by this movement or by the fact that the surface has depth, affects the manner in which the radiation is reflected into the detector 86 and causes the signal level to vary. The use of an oversized focusing lens 82 and/or a diffuser 87 in the form of a disc of flashed opal or ground glass in combination with a cone 88 which may be solid or hollow located immediately in front of the detector 86, help produce a more uniform light level reaching the detector 86, thus improving the dynamic range of the instrument.

Many modifications in the above described embodiments of the invention can be carried out without departing from the scope thereof and therefore the scope of the present invention is intended to be limited only by the appended claims.

I claim:

1. A non-contact optical measurement device for measuring the length or speed of a surface in relative motion with the device comprising:

means for producing an optical interference pattern on the moving surface; and means for receiving modulated radiation reflected from the moving surface, said receiving means including:

detector means for measuring the received reflected radiation; and radiation collector means having a numerical aperture in object space >0.5 for collecting reflected radiation from the surface and focusing the radiation onto the detector, wherein the radiation collector means includes:

refracting optical means for collecting and focusing narrow to moderate angle reflected radiation onto the detector; and reflecting and refracting optical means for collecting and focusing moderate to wide angle reflected radiation onto the detector.

2. A non-contact optical measurement device for measuring the length or speed of a surface in relative motion with the device comprising:

means for producing an optical interference pattern on the moving surface; and means for receiving modulated radiation reflected from the moving surface, said receiving means including:

detector means for measuring the received reflected radiation; and radiation collector means having a numerical aperture in object space >0.5 for collecting reflected radiation from the surface and focusing the radiation onto the detector wherein the radiation collector means includes:

a first positive single lens for collecting narrow to moderate angle radiation reflected from said moving surface, the first lens having a partially reflective coating on the rear surface of the lens;

a concave annular reflector for collecting moderate to wide angle radiation reflected from said moving surface and directing the radiation onto the rear surface of the first lens; and a further optical arrangement for receiving the collected radiation from the first lens and focusing the radiation onto the detector.

3. A non-contact optical measurement device for measuring the length or speed of a surface in relative motion with the device as claimed in claim 2 in which the means for producing an optical interference pattern on the moving surface includes:

laser means for producing a light beam;

first prism means for deflecting a first portion in cross-section of the light beam;

second prism means for deflecting the first deflected portion of the light beam in a direction to converge with the non-deflected portion of the light beam; and mirror means for directing the converging deflected and non-deflected portions of the light beam to form an interference pattern on the moving surface.

4. A non-contact optical measurement device for measuring the length or speed of a surface in relative motion with the device comprising:

means for producing an optical interference pattern on the moving surface; and means for receiving modulated radiation reflected from the moving surface, said receiving means including:

detector means for measuring the received reflected radiation; and radiation collector means having a numerical aperture in object space >0.5 for collecting reflected radiation from the surface and focusing the radiation onto the detector, wherein the means for producing an optical interference pattern on the moving surface includes:

laser means for producing a light beam;

first prism means for deflecting a first portion in cross-section of the light beam;

second prism means for deflecting the first deflected portion of the light beam in a direction to converge with the non-deflect portion of the light beam; and mirror means for directing the converging deflected and non-deflected portions of the light beam to four an interference pattern on the moving surface.

5. A non-contact optical measurement device for measuring the length or speed of a surface in relative motion with the device as claimed in claim 4 in which the light beam is substantially elliptical in cross-section.

6. A non-contact optical measurement device for measuring the length or speed of a surface in relative motion with the device comprising means for producing an optical interference pattern on the moving surface; and means for receiving modulated radiation reflected from the moving surface, said receiving means including:

detector means for measuring the received reflected radiation; and radiation collector means having a numerical aperture in object space >0.5 for collecting reflected radiation from the surface and focusing the radiation onto the detector, which device further includes a diffuser and a cone located between the radiation collector and the detector to render the focussed radiation more uniform on the detector.

7. A non-contact optical measurement device for measuring the length or speed of a surface in relative motion with the device comprising:

means for producing an optical interference pattern on the moving surface; and means for receiving modulated radiation reflected from the moving surface, said receiving means including:

detector means for measuring the received reflected radiation; and radiation collector means having:

a first positive single lens for collecting narrow to moderate angle radiation reflected from said moving surface, the first lens having a partially reflective coating on the rear surface of the lens;

a concave annular reflector for collecting moderate to wide angle radiation reflected from said moving surface and directing the radiation onto the rear surface of the first lens; and a further optical arrangement for receiving the collected radiation from the first lens and focusing the radiation onto the detector.

8. A non-contact optical measurement device for measuring the length or speed of a surface in relative motion with the device as claimed in claim 7 in which the means for producing an optical interference pattern on the moving surface includes:

laser means for producing a light beam;

first prism means for deflecting a first portion in cross-section of the light beam;

second prism means for deflecting the first deflected portion of the light beam in a direction to converge with the non-deflected portion of the light beam; and mirror means for directing the converging deflected and non-deflected portions of the light beam to form an interference pattern on the moving surface.

9. A non-contact optical measurement device for measuring the length or speed of a surface in relative motion with the device as claimed in claim 8 in which the light beam is substantially elliptical in cross-section.

10. A non-contact optical measurement device for measuring the length or speed of a surface in relative motion with the device as claimed in claim 7 which further includes a diffuser and a cone located between the further focussing optical arrangement and the detector to render the focussed radiation more uniform on the detector.

11. A non-contact optical measurement device for measuring the length or speed of a surface in relative motion with the device comprising:

means for producing an optical interference pattern on the moving surface, said means including:
laser means for producing a light beam;
first prism means for deflecting a first portion in cross-section of the light beam;
second prism means for deflecting the first deflected portion of the light beam in a direction to converge with the non-deflected portion of the light beam; and
mirror means for directing the converging deflected and non-deflected portions of the light beam to form an interference pattern on the moving surface; and means for receiving modulated radiation reflected from the moving surface, said receiving means including:
detector means for measuring the received reflected radiation; and
radiation collector means for collecting reflected radiation from the moving surface and focusing the radiation onto the detector.

12. A non-contact optical measurement device for measuring the length or speed of a surface in relative motion with the device as claimed in claim 11 in which the light beam is substantially elliptical in cross-section.

13. A non-contact optical measurement device for measuring the length or speed of a surface in relative motion with the device as claimed in claim 11 in which the radiation collector means has a numerical aperture in object space >0.5.

14. A non-contact optical measurement device for measuring the length or speed of a surface in relative motion with the device as claimed in claim 11 in which the radiation collector means includes:

a Fresnel lens to collect the radiation reflected from the moving surface; and an optical arrangement to receive and focus the collected radiation onto the detector.

15. A non-contact optical measurement device for measuring the length or speed of a surface in relative motion with the device as claimed in claims 11 in which the radiation collector means includes:

an aspheric lens to collect the radiation reflected from the moving surface; and an optical arrangement to receive and focus the collected radiation onto the detector.

16. A non-contact optical measurement device for measuring the length or speed of a surface in relative motion with the device as claimed in claims 11 in which the radiation collector means includes:

a first positive single lens for collecting narrow to moderate angle radiation reflected from said moving surface, the first lens having a partially reflective coating on the rear surface of the lens;

a concave annular reflector for collecting moderate to wide angle radiation reflected from said moving surface and directing the radiation onto the rear surface of the first lens; and a further optical arrangement for receiving the collected radiation from the first lens and focusing the radiation onto the detector.

17. A non-contact optical measurement device for measuring the length or speed of a surface in relative motion with the device as claimed in claims 11 in which the radiation collector means includes:

lens having a refractive index >1.6 to collect the radiation reflected from the moving surface; and
an optical arrangement to receive and focus the collected radiation onto the detector.

18. A non-contact optical measurement device for measuring the length or speed of a surface in relative motion with the device as claimed in claims 11 in which the radiation collector means includes:

a lens made from SF6 glass to collect the radiation reflected from the moving surface; and an optical arrangement to receive and focus the collected radiation onto the detector.

19. A non-contact optical measurement device for measuring the length or speed of a surface in relative motion with the device as claimed in claims 11 in which the radiation collector means includes:

a lens made from ZnS to collect the radiation reflected from the moving surface; and an optical arrangement to receive and focus the collected radiation onto the detector.

* * * * *